(12) United States Patent
Bigolin

(10) Patent No.: US 7,866,744 B2
(45) Date of Patent: Jan. 11, 2011

(54) CHRONOMETER AND TRIATHLON BICYCLE SADDLE CONSTRUCTION

(75) Inventor: Giuseppe Bigolin, Vicenza (IT)

(73) Assignee: Selle Italia S.r.l., Rossano Veneto-Vicenza (IT)

( * ) Notice: Subject to any disclaimer, the term of this patent is extended or adjusted under 35 U.S.C. 154(b) by 184 days.

(21) Appl. No.: 11/986,779

(22) Filed: Nov. 26, 2007

(65) Prior Publication Data

US 2008/0122271 A1   May 29, 2008

(30) Foreign Application Priority Data

Nov. 24, 2006   (IT) ................... MI2006A2262

(51) Int. Cl.
   *B62J 1/00*   (2006.01)
(52) U.S. Cl. .............. 297/195.1; 297/215.16; 297/215.1
(58) Field of Classification Search ............ 297/214, 297/215.1, 215.16, 195.1
   See application file for complete search history.

(56) References Cited

U.S. PATENT DOCUMENTS

| | | | | |
|---|---|---|---|---|
| 4,957,227 A * | 9/1990 | Trimble | ............ | 224/414 |
| 5,108,076 A * | 4/1992 | Chiarella | ............ | 297/214 |
| 5,387,024 A * | 2/1995 | Bigolin | ............ | 297/202 |
| 5,496,089 A * | 3/1996 | Muderlak | ............ | 297/188.12 |
| 5,676,420 A * | 10/1997 | Kuipers et al. | ............ | 297/204 |
| 5,927,802 A * | 7/1999 | Kesinger | ............ | 297/204 |
| 6,561,578 B1 * | 5/2003 | Mel | ............ | 297/195.1 |
| 6,948,770 B1 * | 9/2005 | Lee | ............ | 297/195.1 |
| 7,159,936 B2 * | 1/2007 | Bigolin | ............ | 297/214 |

* cited by examiner

*Primary Examiner*—Sarah B McPartlin
(74) *Attorney, Agent, or Firm*—Hedman & Costigan, P.C.; James V. Costigan

(57) ABSTRACT

A chronometer and triathlon bicycle saddle construction having a bodywork supported by a frame to be coupled to a supporting tubular element of a bicycle, the bodywork having an enlarged bearing region operating for supporting the ischiatic tuberosities of a bicycle user, where the enlarged bearing region substantially corresponds to a middle central zone of the saddle bodywork, the saddle construction further having a water-bottle supporting element at the rear part of the saddle and integral with the saddle bodywork.

6 Claims, 4 Drawing Sheets

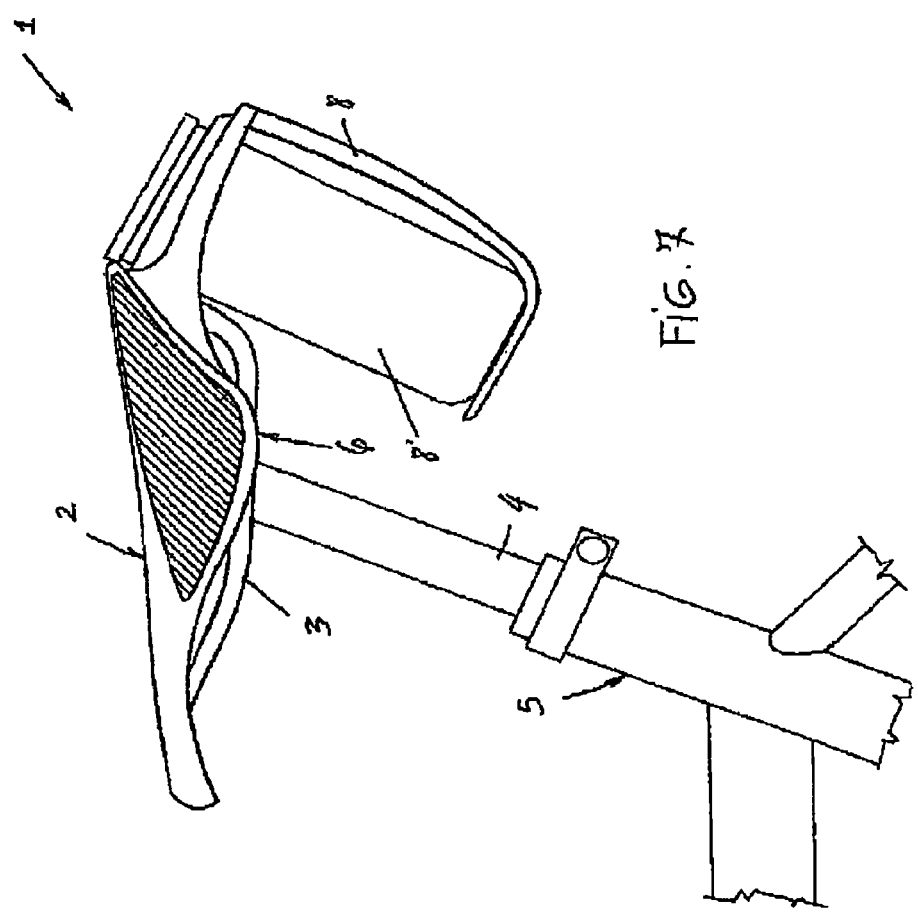

CHRONOMETER AND TRIATHLON BICYCLE SADDLE CONSTRUCTION

BACKGROUND OF THE INVENTION

The present invention relates to a bicycle saddle construction for chrono and triathlon bicycles.

As is known, prior bicycle saddles are conventionally designed with a central/rear bearing region, where the ischiatic tuberosities of the bicycle user may be properly anatomically supported.

FIG. 2 schematically shows, by dashed lines, the contour of a conventional bicycle saddle 100, in which, as it is used in a running position, the main pressure point of the ischiatic tuberosities of the user on the seating surface of the saddle corresponds to the position indicated by the reference number 110.

In such a position, the cyclist weight is properly exerted, and the perineal part is not herein pressed, since the weight of the cyclist is transferred to the cyclist bones, at the points 110.

The seating region, as shown, is arranged at a rear part from the assembling central portion of the saddle holder.

Thus, the position assumed by a cyclist on a conventional bicycle saddle, at a "chrono" position, i.e. on a chronometer and triathlon bicycle, is defined by a seating region which is frontward displaced toward the tip of the saddle, thereby improving the athletic performance, with a larger development of power, aerodynamic characteristics and steering capabilities of the bicycle.

The seating imprints on the conventional saddle 100, for the mentioned chrono positions, are herein indicated by the reference numbers 120.

As shown, the ischiatic tuberosities bear on a narrowed portion of the saddle, and, accordingly, are not properly supported.

The seating region, in a chrono position, is much more frontward displaced than the running position, and it is nearly overlapped on the saddle holder assembling central region.

Accordingly, because of the above disclosed configuration of a prior bicycle saddle, the seating surface, at a chrono position, would be limited and displaced toward the saddle tip portion.

Such a seating arrangement is an uncomfortable one, since, due to the narrowed bearing region supporting the ischiatic tuberosities, the weight of the user is mainly exerted on the perineal part including the fiber-muscular soft tissues.

Moreover, the chrono-type seating on a prior saddle does not properly allow the user to hold such a position for a long time, because of the lack of comfort caused by the narrowed seating region.

Moreover, the geometric limitations of a conventional saddle do not allow to arrange the saddle at an advanced point adapted to fully support the cyclist bones.

Actually, in a conventional saddle, the seating region is excessively moved backward, thereby it cannot be fitted to a proper use in a chrono position, and it is moreover not possible to frontward move, beyond a set point, the position of the saddle on the saddle holder, due to a further limitation caused by a conventional configuration of the saddle framework or body.

SUMMARY OF THE INVENTION

Accordingly, the aim of the present invention is to provide such a bicycle saddle construction allowing a full and proper supporting for the ischiatic tuberosities of the user, both in a running position and in a chrono position of the latter.

Within the scope of the above mentioned aim, a main object of the invention is to provide such a bicycle saddle construction which can be made by using those same constructional materials used for making conventional bicycle saddles.

Yet another object of the present invention is to provide such a bicycle saddle construction adapted to improve the bicycle aerodynamic characteristics.

According to one aspect of the present invention, the above mentioned aim and objects, as well as yet other objects, which will become more apparent hereinafter, are achieved by a bicycle saddle construction, characterized in that said bicycle saddle construction comprises a saddle bodywork supported by a saddle framework which can be coupled to a saddle holder, in turn connectable to a support element of a bicycle.

The saddle bodywork comprises an enlarged bearing region, operating as a bearing zone for the ischiatic tuberosities of the user, and corresponding to a central middle zone coinciding with the connection point of the framework to the saddle holder.

According to a further aspect of the present invention, the bicycle saddle construction comprises a water bottle element built-in in the rear portion of the saddle, and forming a single-piece with the saddle shell.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where:

FIG. 7 is an elevation view of the saddle bicycle construction of the invention, shown in a use condition thereof.

DESCRIPTION OF THE PREFERRED EMBODIMENTS

Figure 1:
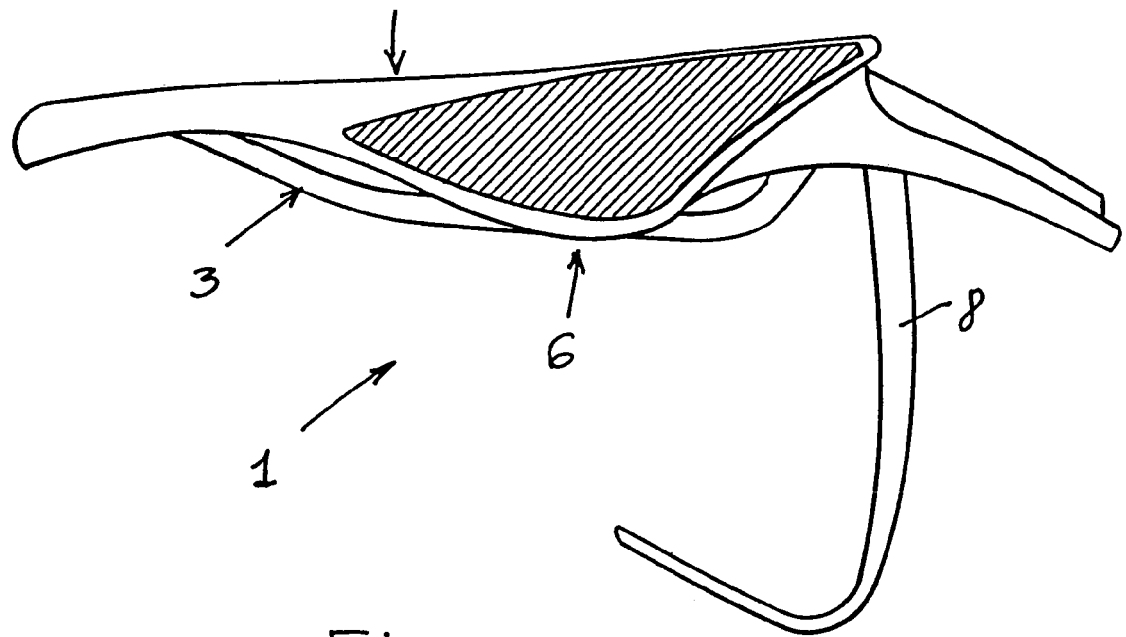
FIG. 1 is a side elevation view of the bicycle saddle construction according to the present invention.
Figure 2:
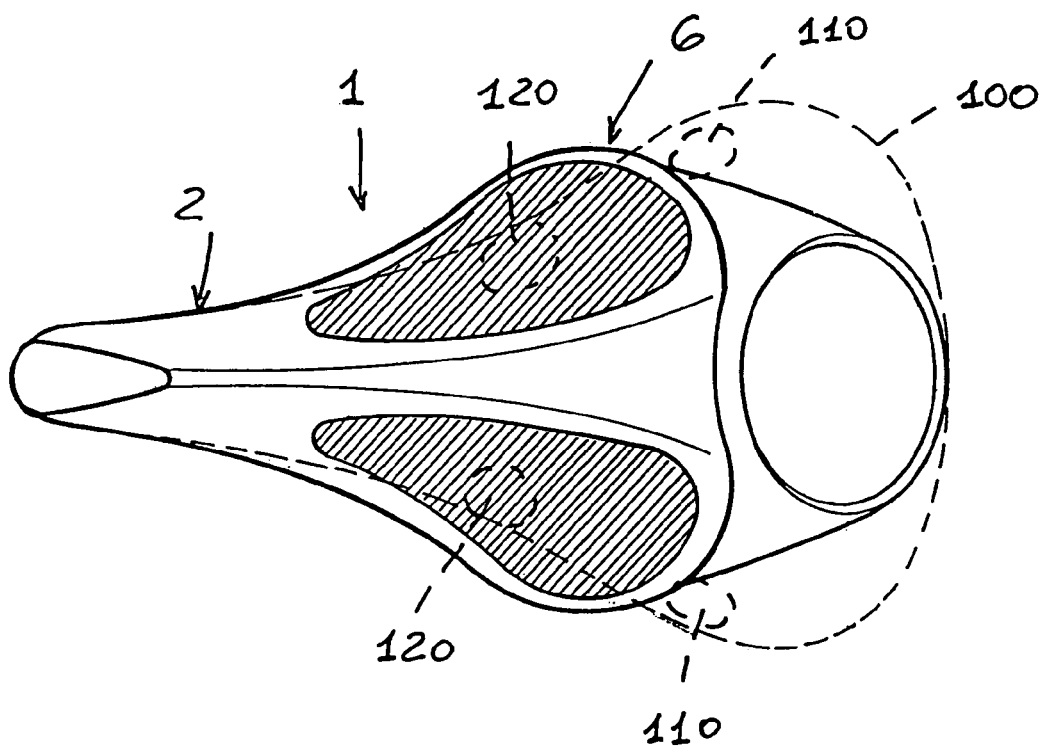
FIG. 2 is a top plan view of the bicycle saddle constructional invention, showing, by dashed lines, the profile or contour of a conventional bicycle saddle.
Figure 3:
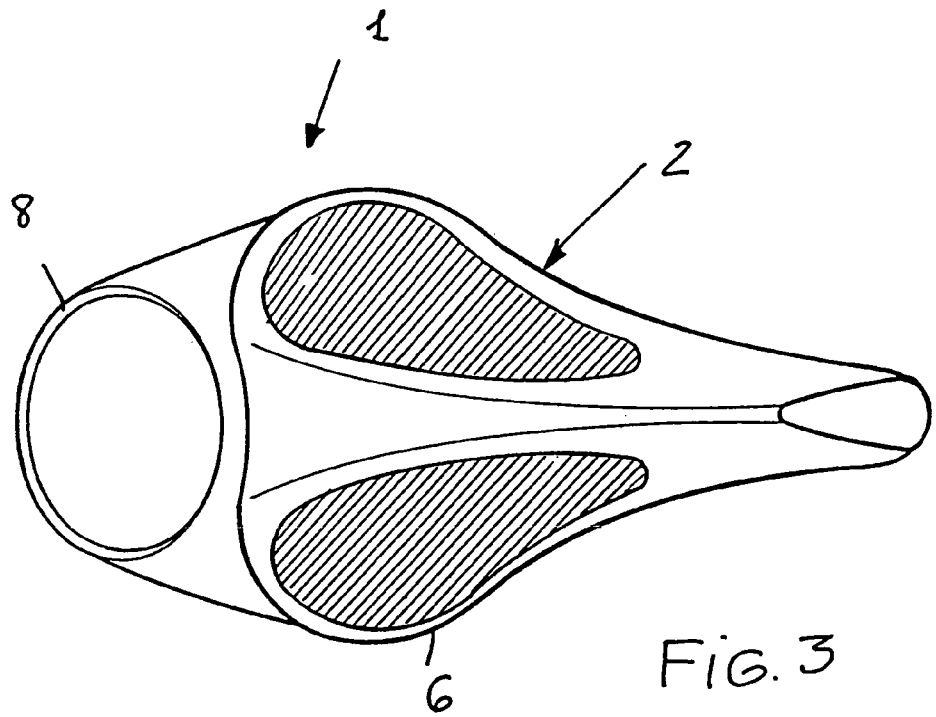
FIG. 3 is a further top plan view of the bicycle saddle construction according to the invention.

With reference to the number references of the above mentioned figures, the bicycle saddle construction according to the invention, which has been generally indicated by the reference number 1, comprises a saddle bodywork 2, supported by a frame 3 and including a saddle padding.

The saddle frame 3 is coupled to a saddle holder, which in turn can be coupled to a supporting element, such as a supporting tube 4, associated with the frame 5 of a bicycle.

Figure 4:
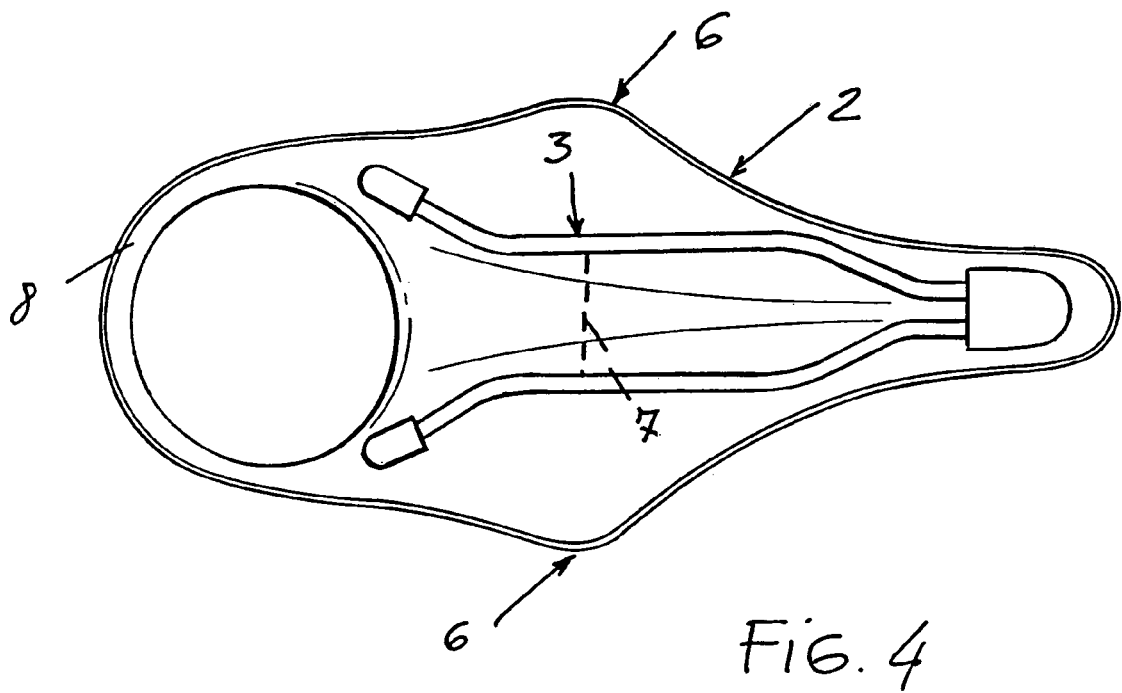
FIG. 4 is a bottom view of the bicycle saddle construction of the invention.
Figure 5:
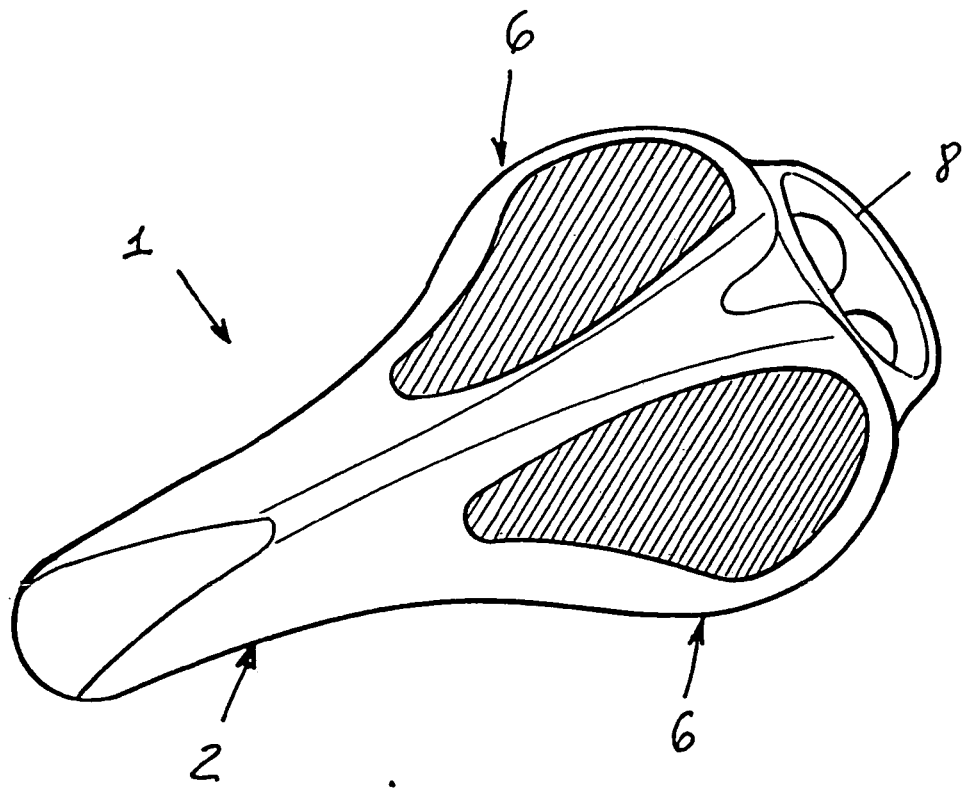
FIG. 5 is a top perspective view of the saddle bicycle construction of the invention.

According to the present invention, the saddle construction bodywork 2 comprises an enlarged region 6, operating as a bearing zone for the ischiatic tuberosities of the user or cyclist, corresponding to a central middle region, schematically indicated by a dashed line 7 in FIG. 4, which would correspond to the coupling point of the frame 3 to the saddle holder.

Said enlarged region 6 allows the ischiatic tuberosities to be fully and properly supported, even in a chrono position of the user, whereas a conventional saddle, as stated, would allow only a bearing of the cyclist perineal region.

This, in particular, is due to an accurate fitting of the ischiatic tuberosity bearing point, and the middle central coupling point 7 of the saddle to the saddle holder.

In such a condition, is greatly limited the back displacement which would be typical of a conventional saddle.

Actually, in a conventional saddle, the back displacement of the seating region, with respect to the saddle holder coupling point, is of about 30-40 mm.

Thus, whereas a conventional saddle does not provide a full and proper supporting of the ischiatic tuberosities of the user, the saddle construction according to the invention, on the contrary, provides a full and proper support.

In this connection it should be pointed out that the bicycle saddle construction according to the present invention can be easily made by using the same materials as those used for making a conventional saddle.

The saddle framework or frame 3, in particular, can be made of a carbon fiber, titanium solid round bars, titanium tubes, steel tubes, steel round bars, iron alloy, solid round bar/tube.

Moreover, the bodywork 2 can be made of a carbon fiber, nylon, carbon filled nylon, polypropylene, polyethylene and like materials.

The padding can either be provided or not and, if it is provided, can comprise a foamed material, such as foamed polyurethane, EVA, gel, and so on.

The coating of the saddle can comprise only a painted layer, leather or hide or a synthetic material coating.

It is also possible to make saddle construction including a central bore, for example of a "gel flow" type, and so on.

Figure 6:
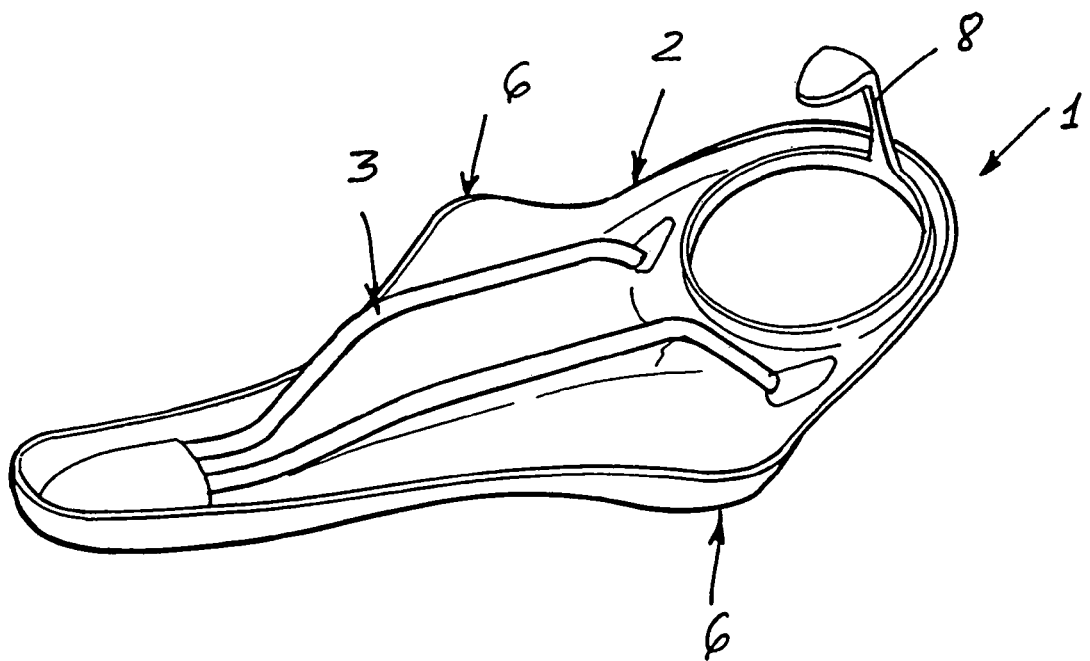
FIG. 6 is a bottom perspective view of the saddle bicycle construction of the invention.

According to a further aspect of the present invention, the inventive saddle construction comprises moreover a water bottle or flask support element, generally indicated by the reference number 8 designed for supporting a water bottle or flask 8', said supporting element including a throughgoing hole portion through the rear portion of saddle bodywork or shell 2 and a hook element extending downward from the rear portion of the saddle bodywork or shell 2, as is clearly shown in FIGS. 1, 6 and 7.

The water bottle support element 8, is built-in in the rear part of the saddle.

The water bottle element 8, built-in in the rear part of the bodywork 2, is such as to improve the bicycle aerodynamic characteristic, owing to a great reduction of the bicycle-cyclist assembly drag.

Actually, as is known, the air-drag of a movable vehicle is proportional to the main surface of the vehicle as projected on a plane perpendicular to the longitudinal axis of the vehicle and the penetration coefficient of said vehicle.

Thus, since the water flask is assembled at the rear part of the saddle, and accordingly on the back of the cyclist, at a position protected with respect to the air flow, a great reduction of the main cross section and of the penetration coefficient will be achieved.

In this connection it should be apparent that the water bottle or flask insert can be interexchanged with an article holder insert.

It has been found that the invention fully achieves the intended aim and objects.

In fact, the invention has provided a bicycle saddle construction suitable to provide a full and proper bearing of the ischiatic tuberosities of the user, both in a running and in a chrono position of the latter, i.e. on chrono and triathlon bicycles.

Moreover, the water bottle built-in in the saddle bodywork, at the rear portion thereof, greatly reduce the bicycle and cyclist assembly drag.

In practicing the invention, the used materials, as well as their contingent size and shapes, can be any, depending on requirements.

The invention claimed is:

1. A bicycle saddle construction for chrono and triathlon bicycles, said bicycle saddle construction comprising a saddle bodywork supported by a saddle framework to be coupled to a tubular support element of a bicycle, wherein said saddle bodywork has an enlarged bearing region operating as a bearing zone for an ischiatic tuberosity of a user and arranged substantially at a central middle region of said saddle bodywork, thereby said enlarged region of said saddle bodywork provides a full bearing region for said ischiatic tuberosity, even in a chrono position of the user, wherein said saddle bodywork further comprises a water bottle support element at a rear portion of said saddle and wherein said support element comprises a throughgoing hole portion through said rear portion of said saddle bodywork and a hook element extending downward from said rear portion of said saddle bodywork thereby providing said saddle with improved aerodynamic characteristics.

2. A bicycle saddle construction, according to claim 1, wherein said enlarged bearing region is arranged backward from said central middle region at a distance much less than 30-40 mm therefrom.

3. A bicycle saddle construction, according to claim 1, wherein said saddle framework is made of a material selected from a group including carbon fibers, titanium round rods, titanium tubes, steel tubes, steel round rods and iron alloy round rods/tubes.

4. A bicycle saddle construction, according to claim 1, wherein said saddle bodywork is made of a material selected from a material group including carbon fibers, nylons, filled nylons, carbon polypropylene and polyethylene.

5. A bicycle saddle construction, according to claim 1, wherein said saddle construction includes a top padding made of foamed material selected from a group including foamed polyurethane, EVA, and a gel material.

6. A bicycle saddle construction, according to claim 1, wherein said saddle bodywork comprises a saddle coating including either a painted coating, or a hide or synthetic material coating.

* * * * *